United States Patent
Meseguer Mata et al.

(10) Patent No.: US 8,657,233 B2
(45) Date of Patent: Feb. 25, 2014

(54) TAIL-CONE OF AN AIRCRAFT WITH MOVABLE FAIRING

(75) Inventors: Alejandro Meseguer Mata, Madrid (ES); Angel Postigo Rodriguez, Getafe (ES); Rafael Villanueva Montero, Alcala de Henares (ES); Daniel De La Sen Perez, Getafe (ES)

(73) Assignee: Airbus Operations, S.L., Getafe (ES)

( * ) Notice: Subject to any disclaimer, the term of this patent is extended or adjusted under 35 U.S.C. 154(b) by 16 days.

(21) Appl. No.: 13/305,289

(22) Filed: Nov. 28, 2011

(65) Prior Publication Data

US 2012/0132749 A1 May 31, 2012

Related U.S. Application Data

(63) Continuation of application No. PCT/ES2010/070173, filed on Mar. 24, 2010.

(30) Foreign Application Priority Data

May 28, 2009 (ES) .................................. P200930217

(51) Int. Cl.
B64C 1/14 (2006.01)
(52) U.S. Cl.
USPC ......................... 244/119; 244/129.4; 244/130
(58) Field of Classification Search
USPC ...................... 244/58, 119, 129.1, 129.4, 130
See application file for complete search history.

(56) References Cited

U.S. PATENT DOCUMENTS

| | | | |
|---|---|---|---|
| 4,920,744 A | 5/1990 | Garcia et al. | |
| 6,039,287 A | 3/2000 | Liston et al. | |
| 6,244,539 B1 | 6/2001 | Liston et al. | |
| 6,247,668 B1 | 6/2001 | Reysa et al. | |
| 6,308,915 B1 | 10/2001 | Liston et al. | |
| 7,703,716 B2 | 4/2010 | Bulin | |
| 2008/0099611 A1 | 5/2008 | Martino Gonzalez et al. | |
| 2010/0327108 A1* | 12/2010 | Prampolini | 244/3.24 |

FOREIGN PATENT DOCUMENTS

| | | |
|---|---|---|
| EP | 1 069 044 A2 | 1/2001 |
| EP | 1 918 203 A1 | 5/2008 |
| FR | 2 622 930 | 5/1989 |
| FR | 2 901 244 | 11/2007 |
| WO | WO 98/05553 | 2/1998 |

OTHER PUBLICATIONS

International Search Report issued Jul. 15, 2010, in PCT/ES 2010/070173.

* cited by examiner

*Primary Examiner* — Philip J Bonzell
*Assistant Examiner* — Timothy Schwarz
(74) *Attorney, Agent, or Firm* — Oblon, Spivak, McClelland, Maier & Neustadt, L.L.P.

(57) ABSTRACT

A tail-cone of an aircraft includes a skin provided with a movable fairing which, by a swing articulated mechanism, is supported on the skin in order to allow the opening/closing of the movable fairing and gain access to the inside of the tail-cone. The tail-cone includes actuators for operating the swing articulated mechanism in order to permit the automatic opening and closing of the movable fairing to be carried out.

13 Claims, 5 Drawing Sheets

TAIL-CONE OF AN AIRCRAFT WITH MOVABLE FAIRING

FIELD OF THE INVENTION

The invention relates to a tail-cone of an aircraft that includes a movable fairing that can be opened in order to permit access to the inside of said tail-cone in which an auxiliary power unit (APU) is conventionally housed.

The invention has the aim of providing a movable fairing which can be opened by means of a swing articulated mechanism permitting access to the APU. Another aim of the invention is to provide actuators which will to operate the swing articulated mechanism in such a way that the opening of the fairing can be done automatically.

DESCRIPTION OF THE PRIOR ART

In the state of the art it is known that the skin of the tail-cone of an aircraft incorporates a movable fairing that can be opened in order to permit access to the inside of the tail-cone, in which the current tendency among the large majority of manufacturers is to locate an auxiliary power unit (APU) inside, which provides electrical and/or pneumatic power to the aircraft. The reason for locating it there is that the APU constitutes a possible source of fire and, as the tail-cone is a secondary structure, any possible damage or fault in the tail-cone would not imply a catastrophic failure. Therefore, in order to prevent possible fires in the primary structures of the aircraft, the APU is located in the tail-cone, furthermore being protected from the rest of the fuselage by means of a fireproof bulkhead.

Given that the APU requires maintenance, the skin of the tail-cone needs to incorporate a door or similar element permitting access to the APU.

In this regard, Spanish patent with application No. P-200602770 can be cited, which describes a movable fairing that can be opened in order to permit access to be had to the APU for carrying out its maintenance. The opening of the movable fairing is carried out by means of rotating shafts oriented in the longitudinal direction of the aircraft, in a way equivalent to how the opening of a hinged lid is carried out.

SUMMARY OF THE INVENTION

The present invention constitutes an alternative to the tail-cones of aircraft with a movable fairing that can be opened cited in the state of the art, comprising, as do the latter, a skin that includes a movable fairing that can be opened, such that its interior houses an auxiliary power unit (APU) which is supported by fixing means, and all this being done in such a way that the movable fairing is displaced from a closed position in which the skin is kept closed housing the APU, to an open position permitting access to the APU. The main novelty of the invention consists of the fact that the movable fairing comprises a lower longitudinal section of the skin of the tail-cone and is also supported by means of a swing articulated mechanism which facilitates access to the APU.

In one embodiment of the invention, the swing articulated mechanism comprises at least a forward rod and a rear rod, the lower ends of which are joined in an articulated way to the movable fairing, while their upper ends are joined either to the inner part of the skin, or to the fixing means of the APU, or to both, depending on the needs for achieving the correct support for the movable fairing.

In order to facilitate the opening and closing of the movable fairing, the invention includes at least one automatic actuator, in such a way that the opening and closing of the fairing is done automatically, considerably facilitating access to the APU.

The actuator can also be manual, in which case it does not provide the advantage of automatic opening, or it is also possible for the actuator to be automatic and incorporate a manual drive/actuating position in case of failure during automatic operation.

In either case the actuators can be pneumatic or hydraulic in order to provide a smooth opening/closing of the movable fairing.

In one embodiment of the invention, the actuator is arranged in such a way that it moves one of the forward or rear rods, or both simultaneously depending on the size and design of the movable fairing.

In the preferred embodiment of the invention the longitudinal section of the skin constituting the movable fairing is defined by the lower longitudinal half of said fairing, in such a way that when the opening and closing of the movable fairing is carried out, there remains a large open space which considerably facilitates access to the APU.

Moreover, in the preferred embodiment of the invention, the swing articulated mechanism consists of a pair of forward rods and a pair of rear rods, which are operated by means of two actuators that can act either on the two forward rods, or on the two rear rods, or on one forward rod and another rear rod Once the movable fairing is in the closed position, and in order to prevent it from being accidentally opened, the invention includes conventional closing means which keep the movable fairing in its closed position, preventing it from opening until said conventional closing means are opened.

Said conventional closing means are arranged uniformly along the closing perimeter of the movable fairing with the skin and with the separation structure for the tail-cone with respect to the rest of the fuselage.

Furthermore, when the movable fairing is in the open position, there exists the risk of it being subjected to lateral loads owing to gusts of wind, for which the invention comprises means of blocking the movable fairing in its open position. These means consist of at least one rod, one end of which is fixed in an articulated way to the inner part of the fairing, with its other end being fixed to the inner part of the upper skin or onto the fixing means of the APU.

In the preferred embodiment of the invention, the means of blocking the movable fairing in its open position are defined by two rods arranged longitudinally and fixed in an articulated way to the inside lower part of the movable fairing, in such a way that when the movable fairing is opened, the rods can be extended and their ends can be fixed to the fixing means of the APU or to the inside of the upper skin, all this in such a way that the rods form a "V" shaped configuration which blocks the movable fairing in its open position so that it absorbs the lateral loads that might be exerted on the movable fairing due to possible gusts of wind.

The fixing means of the APU present an arrangement that is supported either on the separation structure between the tail-cone and the rest of the fuselage, or on the inner structure of the skin, or on both, which is possible due to the arrangement presented by the movable fairing.

It can also be pointed out that once the fairing is closed, with the conventional closing means being closed, hence securing this position, the invention comprises means of sealing the attachment zone of the moveable fairing with the skin and with the rest of the fuselage in said closed position, therefore, in order to gain access to the inside of the tail-cone, it is first of all necessary to remove the sealing means and then, after carrying out the opening of the conventional closing means, to act on the actuators in order to carry out the opening of the movable fairing as was described.

Below, in order to facilitate a better understanding of this descriptive specification and forming an integral part thereof, a series of figures is attached in which the object of the invention has been represented by way of illustration and non-limiting.

DETAILED DESCRIPTION OF THE PREFERRED EMBODIMENT

Figure 1:
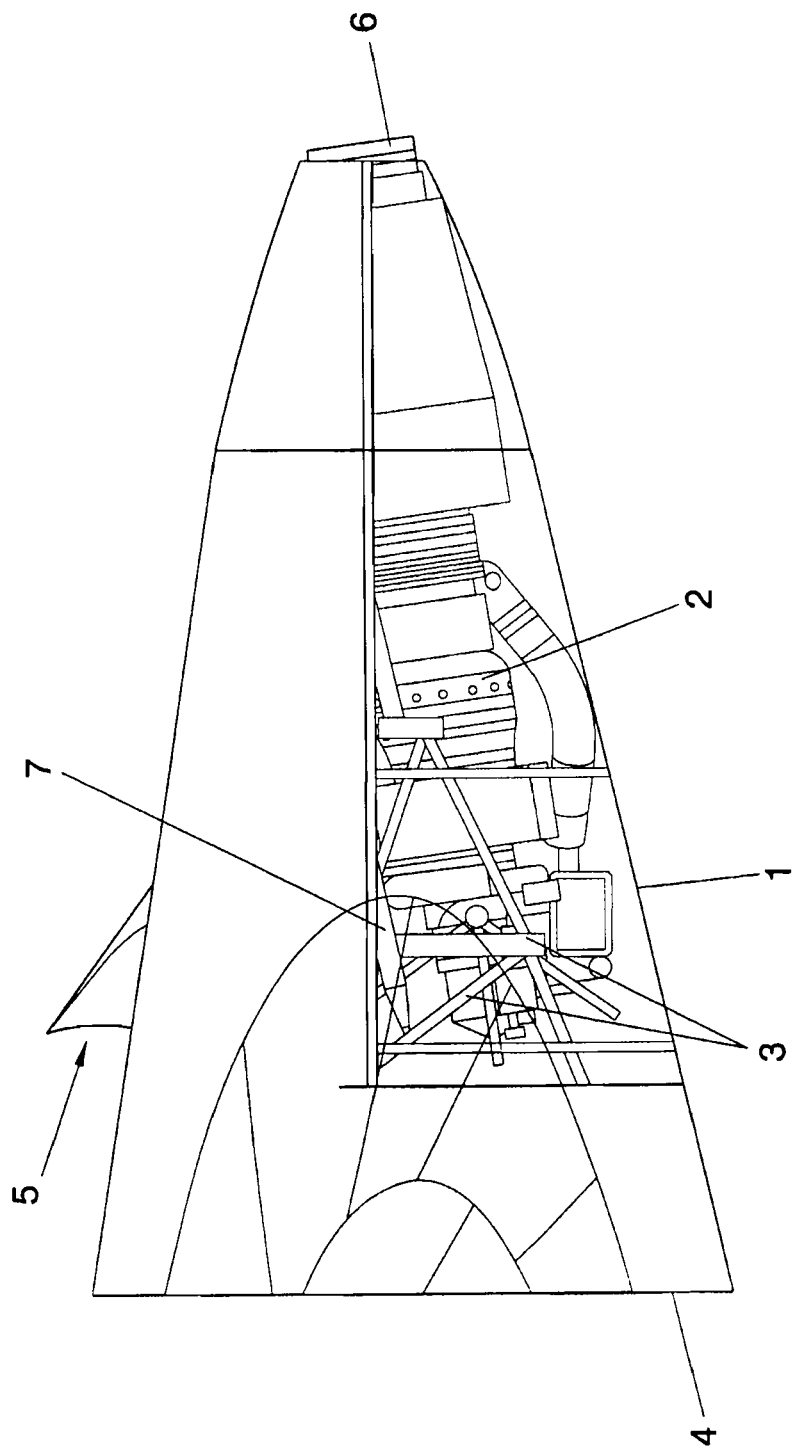
FIG. 1. shows a side elevation view of the tail-cone in which the movable fairing has been drawn transparently.
Figure 2:
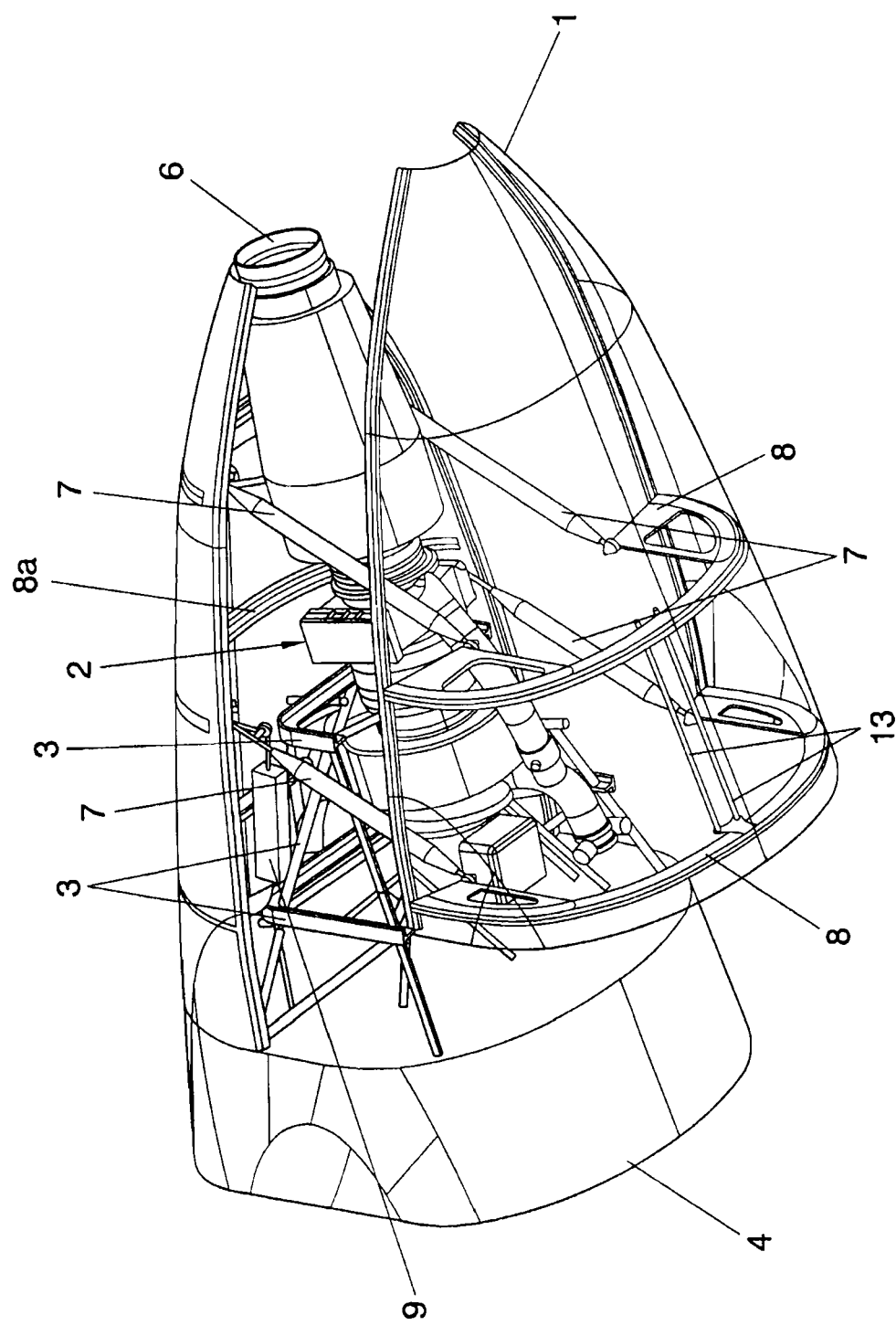
FIG. 2. shows a perspective view of the above figure in which the movable fairing has been represented half-open.
Figure 3:
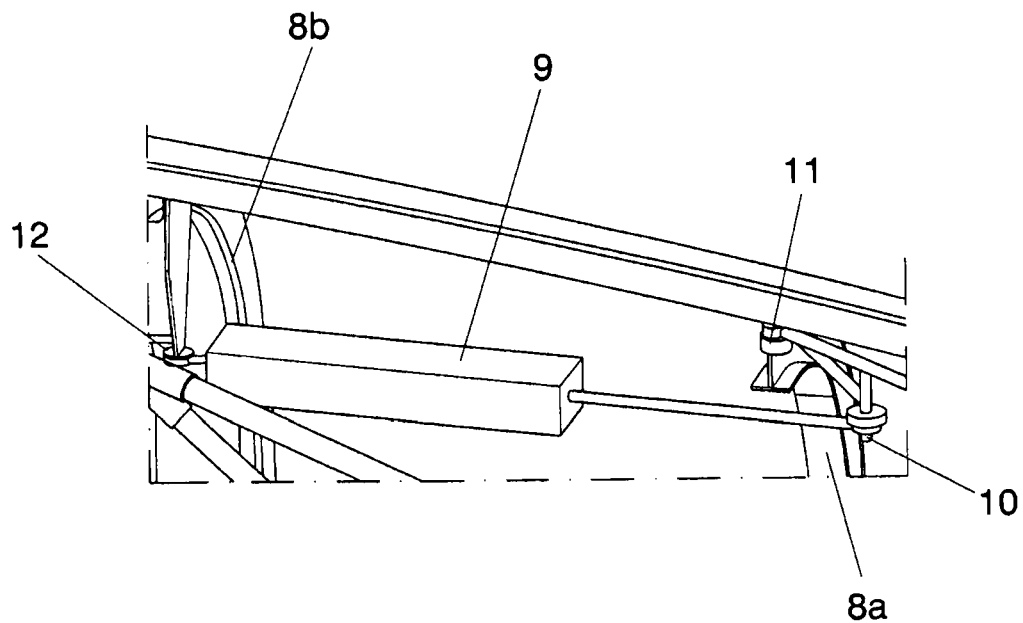
FIG. 3. shows a detail of the fixing of the actuator to one of the rods of the swing articulated mechanism and to the inner part of the upper part of the movable fairing.
Figure 4:
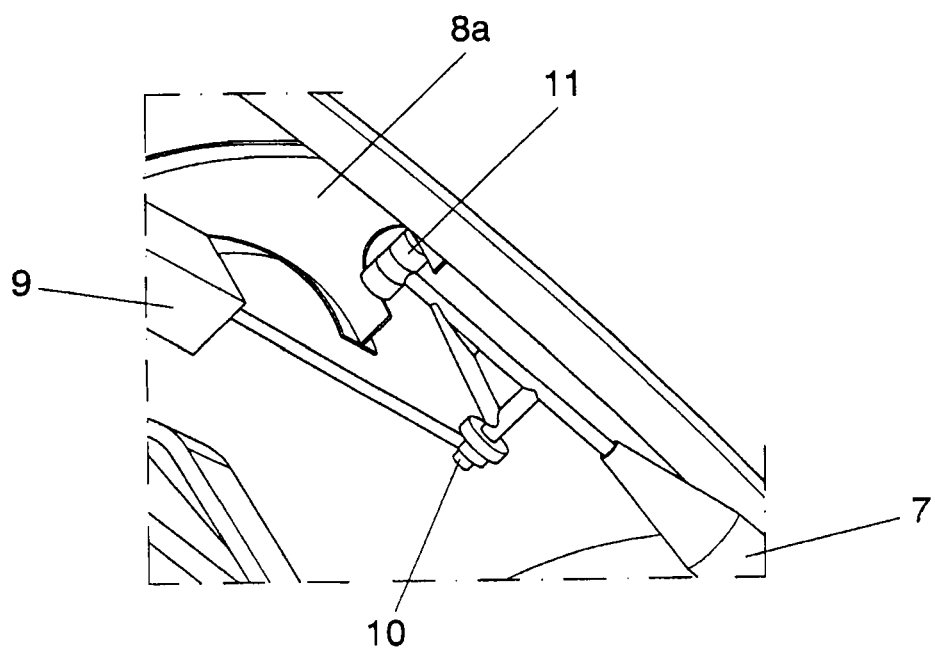
FIG. 4. shows another detail of the fixing of the actuator to the arm in order to allow it to operate, in accordance with the previous figure.

Given below is a description of the invention based on the figures commented on above.

The tail-cone of the invention comprises a skin that is endowed with a movable fairing 1 that can be opened, inside which is housed an auxiliary power unit (APU) 2, which is supported by fixing means 3 defined by a support structure consisting of a series of longitudinal and transverse elements, which are not described in further detail since they are not the object of the invention. In the example of the embodiment these longitudinal and transverse elements are fixed to the separation structure 4 between the tail-cone and the rest of the fuselage.

As is known in the state of the art, and in order to facilitate an understanding of the invention it can be mentioned that the APU 2 is provided with an air intake 5 and an exhaust pipe 6.

The movable fairing 1 is arranged on the skin by means of a swing articulated mechanism consisting of four rods 7, two forward and two rear, whose ends are fixed in an articulated way 11 to the inner part of the upper half of the skin. Likewise, the lower ends of the rods 7 are fixed in an articulated way to the inner part of the movable fairing 1, and more specifically to some frames 8 that are integral with the inside of said movable fairing 1.

In order to facilitate the opening and closing of the movable fairing 1, the invention includes two actuators 9 for operating the rods 7. These actuators 9 are of a hydraulic or pneumatic nature and, in a preferred embodiment, they are governed by a control circuit, the operation of which is permits the opening and closing of the movable fairing 1 to be carried out automatically.

For this purpose, said actuators 9 are fixed by one of their ends to one of the rods 7 by means of a rotating joint 10, and by their other end to a rib 8*b* provided on the inner side of the upper skin, this joint being effected in a rotating point 12. Moreover, the rod 7 is fixed to a rib 8*a* supported on the inside of the upper skin, by means of a rotating point 11.

Once the opening of the movable fairing 1 has been carried out, it needs to be kept in a stable open position, for which purpose blocking means 13 are included for keeping the movable fairing 1 in its open position. These blocking means consist of two rods 13 which are articulated in separate points 14 provided in one of the frames 8, such that in the closed position of the movable fairing 1 they are arranged longitudinally along the inside of said movable fairing 1, and more specifically resting on the frames 8.

Figure 5:
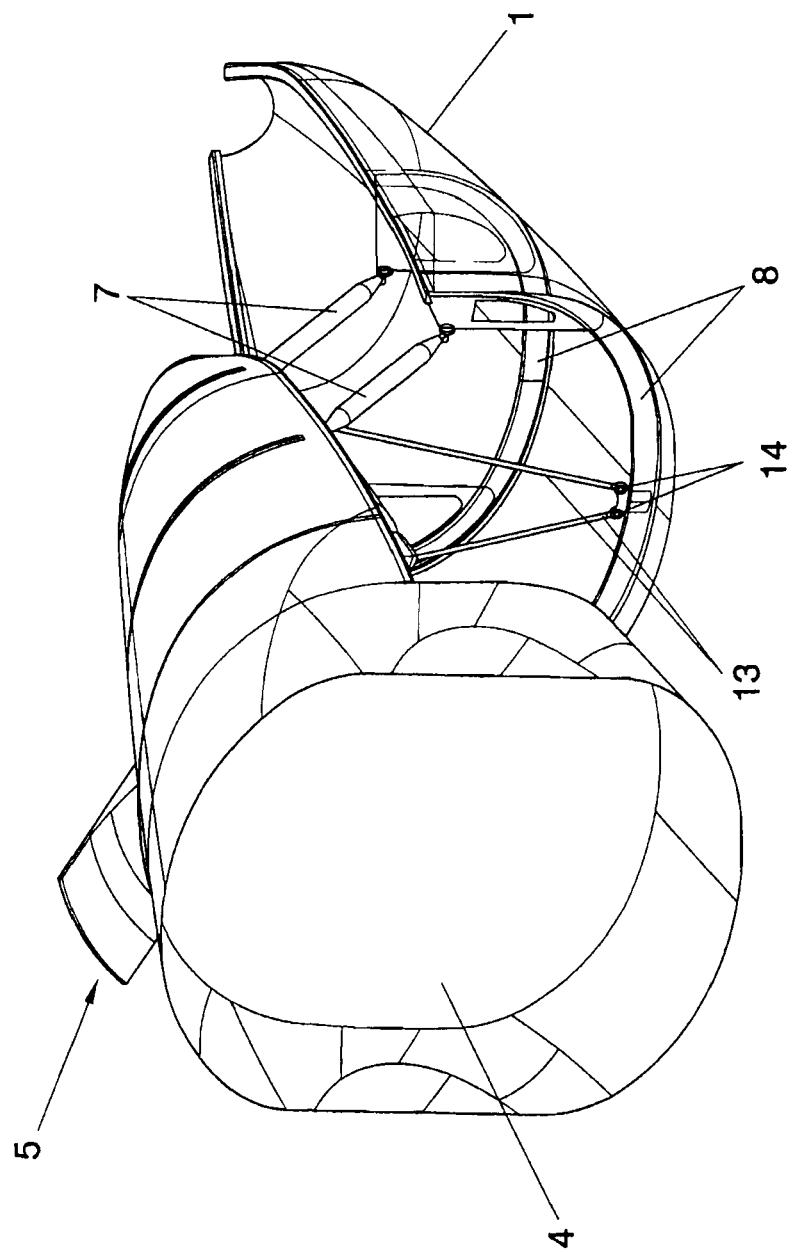
FIG. 5. shows a perspective view of the movable fairing in its open position, in which the rods have also been represented in their blocked position.
Figure 6:
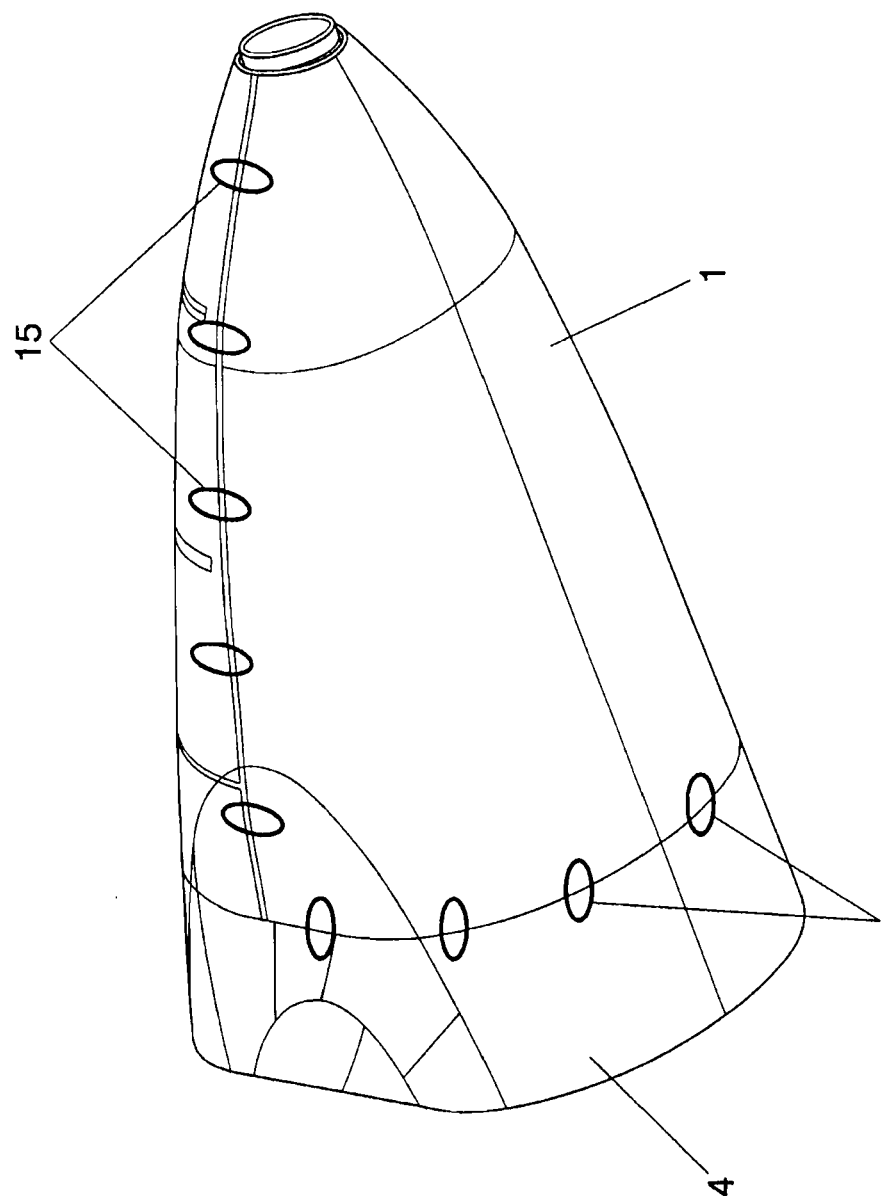
FIG. 6. shows a perspective view of the movable fairing in its closed.

Once the opening of the movable fairing 1 is carried out by operating the actuators 7, until the movable fairing 1 is situated in its open position (FIG. 5), the rods 13 open are extended to a substantially vertical position, in such a way that they are fixed to the inside of the upper half of the skin, which secures the positioning of the open position of the movable fairing 1 with regard to any possible lateral wind gusts that might occur.

Finally, it can be pointed out that the invention includes conventional closing means 15 which are uniformly distributed along the closing perimeter of the articulated movable fairing 1 with the closure of the skin and with the separation structure 4 between the tail-cone and the rest of the fuselage, all this in order to maintain a secure closed position for the movable fairing 1 in such a way that it is prevented from being accidentally opened.

In addition, sealing means are included for the joining zone between the movable fairing 1 and the skin and the rest of the fuselage in its closed position, in such a way that, in order to carry out the opening of the movable fairing 1 it is first of all necessary to remove the seal and then carry out the opening of the conventional closing means 15, at which point the actuators 9 are able to be operated in order to effect the opening in the manner already mentioned.

In order to carry out the closure of the movable fairing 1, the reverse procedure is followed.

The sealing means are defined in line with the periodicity with which the APU needs to be accessed, and as a consequence will be any of those provided for in the state of the art in such a way that permits them to be replaced quickly and simply in accordance with that periodicity.

The invention claimed is:

1. A tail-cone of an aircraft comprising:
a skin whose interior houses an auxiliary power unit (APU) supported by fixing means; wherein the tail-cone has a longitudinal axis, the skin includes an upper half fixed to the tail-cone and a movable fairing which consists of a lower longitudinal section of the skin, a perimeter of said lower longitudinal section mates with a perimeter of said upper half, the upper half being located above the longitudinal axis of the tail-cone and the lower longitudinal section being located below the longitudinal axis of the tail-cone, the upper half always is positioned above the lower longitudinal section relative to the longitudinal axis, the movable fairing being displaceable by a swing articulated mechanism configured to swing the movable fairing from a closed position in which the skin is kept closed housing the APU to an open position in which access is permitted to the APU.

2. The tail-cone of claim 1, wherein the swing articulated mechanism comprises at least one forward rod and one rear rod, lower ends of the at least one forward rod and one rear rod are articulately joined to the movable fairing and upper ends of the at least one forward rod and one rear rod are joined to an element selected among the inner part of the skin, the fixing means of the APU and a combination of them.

3. The tail-cone of claim 2, wherein the swing articulated mechanism comprises at least one actuator for an operation selected among a manual operation, an automatic operation and a combination of them; the at least one actuator being selected between pneumatic and hydraulic actuators.

4. The tail-cone of claim 3, wherein the actuator is coupled to a rod of the swing articulated mechanism, said rod being selected among the forward arm, the rear arm and a combination of both.

5. The tail-cone of claim 4, wherein the swing articulated mechanism comprises two pairs of rods; one pair of forward rods and one pair of rear rods; and the mechanism includes two actuators.

6. The tail-cone of claim 1, wherein the longitudinal section of the skin constituting the movable fairing is defined by the lower longitudinal half of said skin.

7. The tail-cone of claim 6, wherein the swing articulated mechanism comprises two pairs of rods; one pair of forward rods and one pair of rear rods; and the mechanism includes two actuators.

8. The tail-cone of claim 1, wherein the swing articulated mechanism comprises two pairs of rods; one pair of forward rods and one pair of rear rods; and the mechanism includes two actuators.

9. The tail-cone of claim 1, further comprising:
blocking means for blocking the movable fairing in the open position.

10. The tail-cone of claim 9, wherein the blocking means of the movable fairing in the open position comprise at least one rod which is fixed in an articulated way to the inner part of the movable fairing and an other end is fixed to an element selected between the fixing means of the APU and the inner part of the upper skin when the movable fairing is in the open position.

11. The tail-cone of claim 10, wherein the blocking means of the movable fairing in the open position comprise two rods which are arranged longitudinally and articulately connected to the inner and to the lower part of the movable fairing, so that, when carrying out the opening of the movable fairing, the rods can be opened out and free ends fixed to an element selected between the fixing means of the APU and the inside of the upper skin in the open position of the movable fairing, the two rods forming a "V" shaped arrangement.

12. The tail-cone of claim 1, wherein the fixing means of the APU present an arrangement supported on a structure selected among a separation structure of a rest of a fuselage, the inner structure of the skin and a combination of both.

13. The tail-cone of claim 1, further comprising:
means for sealing of a zone of attachment of the movable fairing with the skin and with a rest of a fuselage in the closed position.

* * * * *